(12) United States Patent
Takahashi

(10) Patent No.: US 7,477,399 B2
(45) Date of Patent: Jan. 13, 2009

(54) INNER SURFACE MEASURING APPARATUS

(75) Inventor: Susumu Takahashi, Iruma (JP)

(73) Assignee: Olympus Corporation, Tokyo (JP)

( * ) Notice: Subject to any disclaimer, the term of this patent is extended or adjusted under 35 U.S.C. 154(b) by 114 days.

(21) Appl. No.: 11/493,712

(22) Filed: Jul. 24, 2006

(65) Prior Publication Data
US 2007/0024858 A1 Feb. 1, 2007

(30) Foreign Application Priority Data
Jul. 28, 2005 (JP) .............................. 2005-218654

(51) Int. Cl.
G01B 9/02 (2006.01)
G01B 11/02 (2006.01)

(52) U.S. Cl. ...................................... 356/497; 356/479

(58) Field of Classification Search ................. 356/479, 356/486, 492, 497
See application file for complete search history.

(56) References Cited

U.S. PATENT DOCUMENTS

| | | | | |
|---|---|---|---|---|
| 6,134,003 | A * | 10/2000 | Tearney et al. ............... | 356/479 |
| 6,263,234 | B1 * | 7/2001 | Engelhardt et al. ........... | 600/476 |
| 6,445,939 | B1 * | 9/2002 | Swanson et al. .............. | 600/342 |
| 6,462,815 | B1 * | 10/2002 | Drabarek et al. .......... | 356/241.1 |
| 6,485,413 | B1 * | 11/2002 | Boppart et al. ............... | 600/160 |
| 6,490,046 | B1 * | 12/2002 | Drabarek et al. ............ | 356/489 |
| 6,507,747 | B1 * | 1/2003 | Gowda et al. ................ | 600/407 |
| 6,527,708 | B1 * | 3/2003 | Nakamura et al. ........... | 600/160 |
| 6,741,355 | B2 * | 5/2004 | Drabarek ..................... | 356/482 |
| 7,187,450 | B2 * | 3/2007 | Drabarek ..................... | 356/497 |

OTHER PUBLICATIONS

Sensibility. (1992). In Academic Press Dictionary of Science and Technology. Retrieved Feb. 1, 2008, from http://www.credoreference.com/entry/3156837.*
Mitutoyo Corporation, Product Information, Searched on May 31, 2005, Internet <URL: http://www.mitutoyo.co.jp/products/keijyou_hyomen-Hyomen_01.html>.

* cited by examiner

Primary Examiner—Gregory J Toatley, Jr.
Assistant Examiner—Scott M Richey
(74) Attorney, Agent, or Firm—Kenyon & Kenyon LLP

(57) ABSTRACT

An inner surface measuring apparatus includes: a low coherent light source that outputs low coherent light; a low coherent light dividing section that divides one portion of the low coherent light; a light path length adjusting section that adjusts a light path length of one of the low coherent lights divided by the low coherent light dividing section; a straight rod shaped probe that irradiates the other of the low coherent lights divided from a front end section onto a measurement object; a low coherent light multiplexing section that multiplexes a low coherent light that returns having been reflected on the measurement object with the one low coherent light whose light path length has been adjusted by the light path length adjusting section; a light detector that detects the multiplexed low coherent light; and a rotation mechanism that relatively rotates the probe and the measurement object.

3 Claims, 4 Drawing Sheets

INNER SURFACE MEASURING APPARATUS

BACKGROUND OF THE INVENTION

1. Field of the Invention

The present invention relates to an inner surface measuring apparatus.

This application is based on Japanese Patent Application No. 2005-218654, the content of which is incorporated herein by reference.

2. Description of Related Art

Conventionally, a surface state meter having a contacting probe is known as an apparatus for measuring surface information of a measurement object, such as surface roughness and contour shape, (for example, Mitutoyo Corporation, Product Information, Searched on 31 May 2005, Internet <URL: http://www.mitutoyo.co.jp/products/keijyou_hyomen/hyomen_01.html>).

This surface state meter measures a contour shape and so forth of a measurement object by making a contacting probe contact with the surface of the measurement object and relatively moving the contacting probe. Specifically, this surface state meter measures the contour shape and so forth of the measurement object by detecting an amount of movement of the contacting probe along the surface shape of the measurement object.

However, there are limits in measuring surface shape using the contacting probe. For example, in the case of measuring the inner surface shape of a hole where a sectional area of the hole is comparatively large and an inside diameter of the hole is unlikely to change in the depth direction of the hole, it is possible to measure by making a small probe contact with the inner surface. However, in the case where the sectional area of the hole is comparatively small and the inside diameter is small at the entry of the hole and becomes greater further away from the entry in the depth direction, there is a disadvantage in that a small probe that can pass through the entry cannot make contact with the inner surface at the deeper end of the hole, making measuring difficult.

BRIEF SUMMARY OF THE INVENTION

In consideration of the heretofore known problems described above, an object of the present invention is to provide an inner surface measuring apparatus that enables highly accurate measurement of an inner surface shape of a hole, in particular, an inner surface shape of a hole the entry of which is narrow and which becomes wider further in from the entry.

In order to achieve the above object, the present invention provides the following means.

The present invention provides an inner surface measuring apparatus comprising: a low coherent light source that outputs low coherent light; a low coherent light dividing section that divides one portion of the low coherent light outputted from the low coherent light source in to two; a light path length adjusting section that adjusts a light path length of one of the low coherent lights divided by the low coherent light dividing section; a straight rod shaped probe that irradiates the other of the low coherent lights divided by the low coherent light dividing section from a front end section onto a measurement object arranged in a direction intersecting with the lengthwise direction of the probe; a low coherent light multiplexing section that multiplexes a low coherent light that returns having been reflected on the measurement object with the one low coherent light whose light path length has been adjusted by the light path length adjusting section; a light detector that detects the multiplexed low coherent light; and a rotation mechanism that relatively rotates the probe and the measurement object about an axis along the lengthwise direction of the probe.

According to the present invention, the front end of the probe is inserted into a hole that is the object of the measurement, the low coherent light source outputs low coherent light, and the outputted low coherent light is divided into two by the low coherent light dividing section. The light path length of one of the divided low coherent lights is adjusted by the light path length adjusting section. The other of the low coherent lights enters into the probe, and is outputted from the front end section of the rod shaped probe in a direction intersecting with the lengthwise direction, and is irradiated on the measurement object arranged in that direction. The other low coherent light is reflected on the measurement object and returns through the probe. The other low coherent light, which has returned in this way, is multiplexed with the one low coherent light, the light path length of which has been adjusted, by the low coherent light multiplexing section. When the light path lengths of two of these coherent lights match with each other at a high level of accuracy, both of the low coherent lights interfere with each other, resulting in a variation in a light amount of the multiplexed low coherent light that is detected by the light detector. Therefore, by monitoring a variation in the light amount detected by the light detector while relatively rotating the probe and the measurement object by the operation of the rotation mechanism, a distance from the probe to the inner surface of the hole, which is the measurement object, can be measured at a high level of accuracy for the entire periphery.

The above invention may also comprise: an illumination light source that outputs illumination light; an illumination light multiplexing section that is arranged between the probe and the multiplexing section and that receives the illumination light from the illumination light source along an optical axis of the low coherent light; a light dividing section that divides the illumination light reflected on the measurement object from the low coherent light; an image pickup device that picks up the divided reflected light; and a display device that displays an image obtained by the image pickup device.

Thus, upon the operation of the illumination light multiplexing section, the illumination light emitted from the illumination light source is outputted on the optical axis of the low coherent light and is irradiated together with the low coherent light on the measurement object. The illumination light reflected on the measurement object returns into the probe together with the low coherent light. This returned reflected light is divided from the low coherent light in the light dividing section, and is picked up by the image pickup device and the obtained image is displayed by the display device.

Thus, it becomes possible to carry out measurement of the surface shape while monitoring the surface status of the measurement object with the image. Therefore, in the case where a rapid change or the like occurs in the measurement values when measuring the surface shape, the surface status can be confirmed with the image.

Furthermore, in the above invention, the illumination light source may output an excitation light outside the sensibility of the image pickup device, and on the front end of the probe there may be provided a fluorescent substance that generates visible light when excited by the excitation light, and a reflection light multiplexing section that merges the visible light reflected by the measurement object with the light path of the excitation light.

Thus, the excitation light, which has been emitted from the illumination light source and is outside the sensibility of the image pickup device, excites the fluorescent substance on the front end of the probe and generates the visible light, and the generated visible light illuminates the measurement object. The reflected light of the visible light reflected on the measurement object is merged into the light path of the excitation light by the reflection light multiplexing section and returns, and it is divided by the light dividing section and picked up by the image pickup device, and the obtained image is displayed by the display device.

In this case, since the excitation light is irradiated from the illumination light source, and the visible light is generated at the front end of the probe, flare that occurs when the visible light travels through each optical system can be suppressed compared to the case of irradiating the visible light from the illumination light source. As a result, a clear image having less flare can be displayed by the display device.

Furthermore, in the above invention, on the illumination light source side of the fluorescent substance there may be arranged a visible light reflection film that allows the excitation light to pass through while reflecting the visible light.

Thus, the visible light generated by the fluorescent substance is reflected by the visible light reflection film and it is thereby prevented from returning to the illumination light source side and flare occurrence can be suppressed, while an amount of the illumination light to be irradiated on the measurement object can be increased and a bright and clear image can be obtained.

According to the present invention, an effect can be achieved such that the inner surface shape of a hole, in particular, the inner surface shape of a hole the entry of which is narrow and which becomes wider further in from the entry, can be measured at a high level of accuracy.

DETAILED DESCRIPTION OF THE INVENTION

Figure 1:
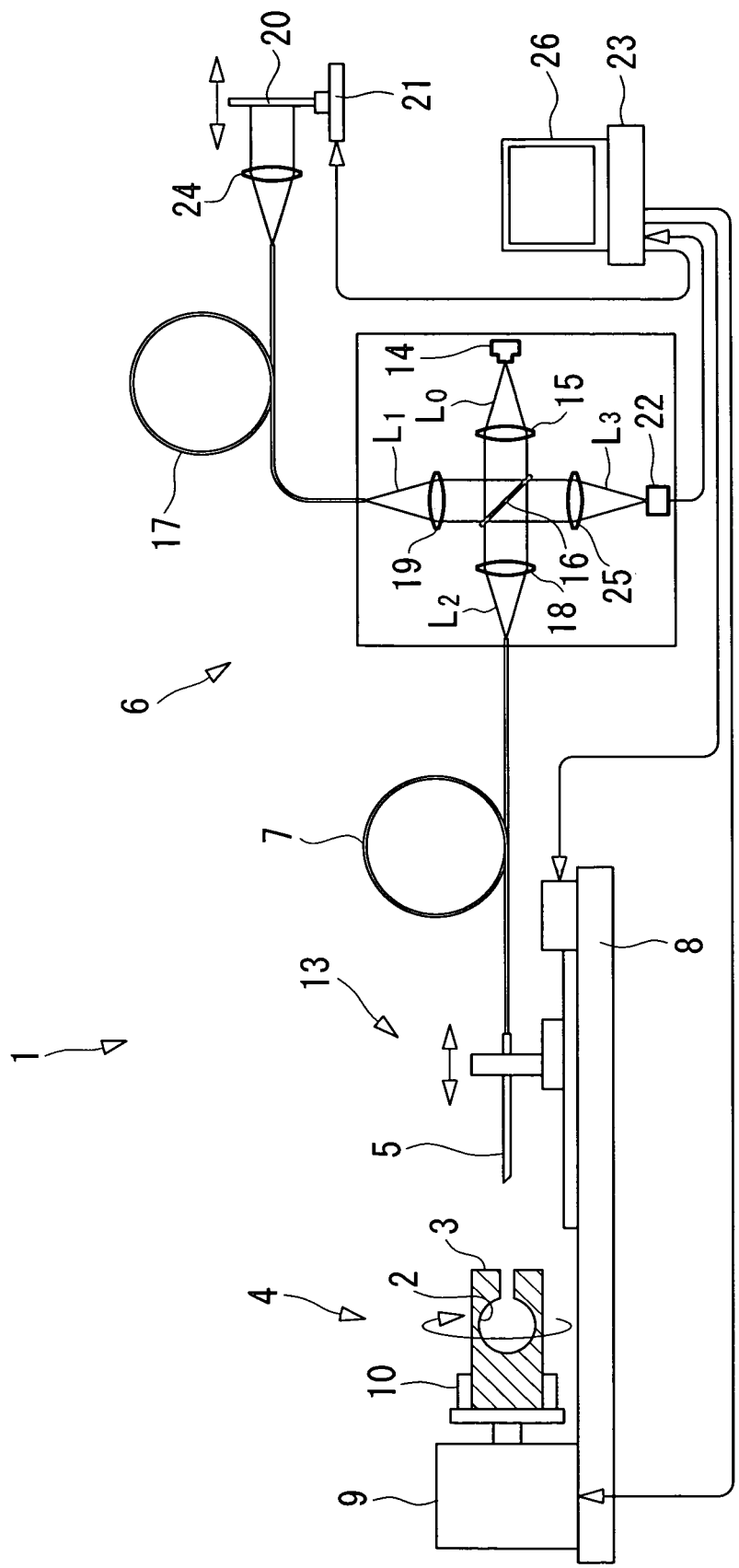
FIG. 1 is an overall configuration diagram that schematically shows an inner surface measuring apparatus according to a first embodiment of the present invention.
Figure 2:
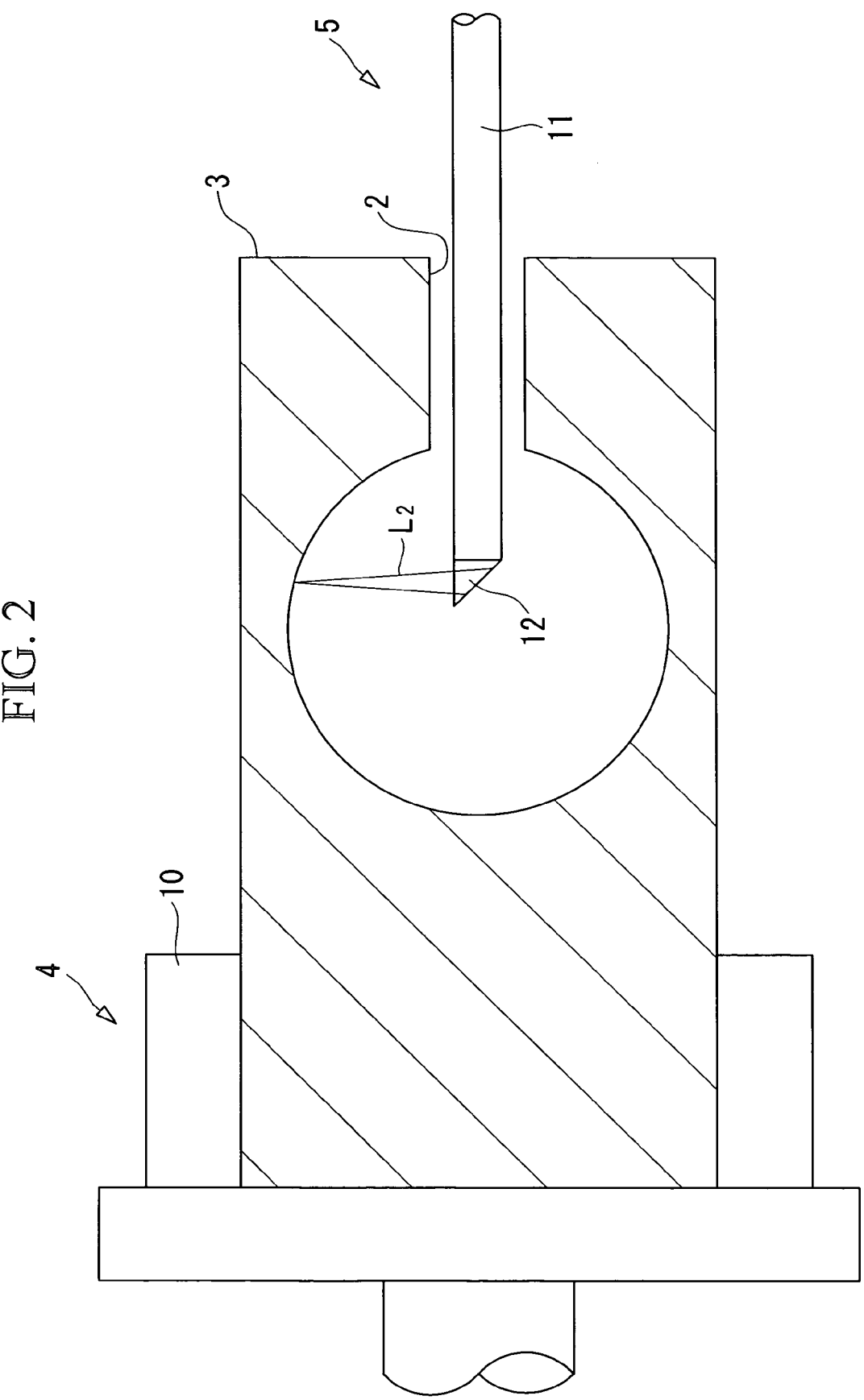
FIG. 2 is a partially enlarged view showing a relationship between a probe and workpiece of the inner surface measuring apparatus shown in FIG. 1.

Hereunder is a description of an inner surface measuring apparatus 1 according to a first embodiment of the present invention, with reference to FIG. 1 and FIG. 2.

As shown in FIG. 1, the inner surface measuring apparatus 1 according to the present embodiment is provided with: a rotation mechanism 4 that holds a workpiece 3 having a hole 2 and rotates the workpiece 3 substantially around a central axis of the hole 2; a probe 5 that is inserted into the hole 2 along the central axis of the hole 2; a measuring apparatus main body 6 that measures an inner surface shape of the hole 2 by irradiating light via the probe 5 and detecting reflected light from the inner surface of the hole 2 of the workpiece 3; and an optical fiber 7 that connects the probe 5 and the measuring apparatus main body 6.

The rotation mechanism 4 is provided with a motor 9 fixed on a base 8, and a chuck 10 provided on a rotational shaft of the motor 9. By operating the motor 9 while the workpiece 3 is being held by the chuck 10, the workpiece 3 can be rotated substantially around the central axis of the hole 2, and can be stopped at a predetermined angle position.

As shown in FIG. 2, the probe 5 is formed in a rod shape of a diameter that allows the probe 5 to be inserted into the hole 2 of the workpiece 3, and internally has a heterogeneous medium lens 11 that relays low coherent light $L_0$ (described later) entering from a rear end side of the probe 5 along a lengthwise direction to a front end side, and a prism 12 that deflects the low coherent light $L_0$ relayed to the front end through 90 degrees and outputs it in a radial direction. The probe 5 is disposed in a position on the central axis of the workpiece 3 fixed on the rotation mechanism 4, and is made so that its front end position can be shifted along the central axis by a rectilinear movement mechanism 13.

The measuring apparatus main body 6 comprises: a coherent light source 14 that outputs the low coherent light $L_0$; a collimator lens 15 that makes the low coherent light $L_0$ outputted from the coherent light source 14 into substantially parallel light; a half mirror 16 that divides the low coherent light $L_0$, which has been made into parallel light, into a reference light $L_1$ and a measuring light $L_2$ and that multiplexes the returned measuring light $L_2$ and reference light $L_1$; coupling lenses 18 and 19 that collect the reference light $L_1$ and the measuring light $L_2$ and input them into one end of optical fibers 7 and 17; a mirror 20 disposed on the other end side of the optical fiber 17, that reflects the reference light $L_1$ that has been propagated through the inside of the optical fiber 17; a mirror moving mechanism 21 that moves the mirror 20 in a light-axis direction; a light detector 22 that detects a multiplexed low coherent light $L_3$; and a shape extraction section 23 that extracts the inner surface shape of the hole 2 of the workpiece 3 based on a light amount of the low coherent light $L_3$ detected by the light detector 22 and on information of a rotational angle position of the workpiece 3 from the rotation mechanism 4, and based on information of an axial direction position from the rectilinear movement mechanism 13. In the diagram, reference symbol 24 denotes a collimator lens, reference symbol 25 denotes a condensing lens, and reference symbol 26 denotes a monitor.

In the present embodiment, lengths of the optical fibers 7 and 17 are set to substantially equalize light path lengths of the measuring light $L_2$ and reference light $L_1$, which have been divided by the half mirror 16.

Hereunder is a description of the operation of the inner surface measuring apparatus 1 according to the present embodiment which is configured as described above.

In order to measure an inner surface shape of the hole 2 of the workpiece 3 using the inner surface measuring apparatus 1 according to the present embodiment, first, the workpiece 3 is held by the chuck 10 of the rotation mechanism 4 so that it can be rotated substantially around the central axis of the hole 2 by operation of the motor 9. Subsequently, the probe 5 is inserted into the hole 2 of the workpiece 3 by operation of the rectilinear movement mechanism 13, and the axial direction position of the front end of the probe 5 is adjusted.

In this state, the low coherent light source 14 outputs the low coherent light $L_0$. Having been made into substantially parallel light by the collimator lens 15, the low coherent light $L_0$ is partially transmitted through, and partially reflected by, the half mirror 16. The portion of the low coherent light that has been transmitted is used as the measuring light $L_2$. The portion of the low coherent light that has been reflected is used as the reference light $L_1$.

The measuring light $L_2$ is input into one end of the optical fiber 7 by the coupling lens 18, and having been propagated inside the optical fiber 7, is input into the rear end of the probe 5. In the probe 5, the measuring light $L_2$ is relayed to the front end by the heterogeneous medium lens 11 and then deflected through 90 degrees by the prism 12 arranged on the front end, and output in the outward radial direction.

The inner surface of the hole 2 of the workpiece 3 is disposed in the outward radial direction of the probe 5. Consequently, the measuring light $L_2$ reflected by the inner surface of the hole 2 returns into the probe 5, and returns into the measuring apparatus main body 6 via the prism 12, the heterogeneous medium lens 11, and the optical fiber 7.

The measuring light $L_2$ that is returned into the measuring apparatus main body 6 is made into substantially parallel light by the coupling lens 18, and then reflected by the half mirror 16 and collected by the condensing lens 25 and detected by the light detector 22.

Meanwhile, the reference light $L_1$ reflected by the half mirror 16 is input into one end of the optical fiber 17 by the coupling lens 19, and is propagated through the optical fiber 17. Subsequently, the reference light $L_1$ is output from the other end of the optical fiber 17, and is made into substantially parallel light by the collimator lens 24, then reflected by the mirror 20. By being reflected by the mirror 20, the reference light $L_1$ returns via the collimator lens 24, the optical fiber 17, and the coupling lens 19, and is transmitted through the half mirror 16 and collected by the condensing lens 25, and detected by the light detector 22.

The light path length of the measuring light $L_2$ and the light path length of the reference light $L_1$ are set to be substantially equal. In the case where the light path lengths of the measuring light $L_2$ and the reference light $L_1$ differ from each other, interference between the reference light $L_1$ and the measuring light $L_2$ does not occur, and a total light amount is detected by the light detector 22. On the other hand, by moving the mirror 20 by operation of the mirror moving mechanism 21, the reference light $L_1$ and the measuring light $L_2$ interfere with each other in a position where the light path length of the measuring light $L_2$ matches the light path length of the reference light $L_1$ at high level of accuracy.

When the reference light $L_1$ and the measuring light $L_2$ interfere with each other, an interference fringe occurs and the light amount detected by the light detector 22 rapidly increases or decreases as a result. Therefore, with the rotation mechanism 4 and the rectilinear movement mechanism 13 stopped in predetermined positions so that the relative positions of the workpiece 3 and probe 5 are fixed, by finding a position where the light amount detected by the light detector 22 rapidly increases or decreases by moving the mirror 20 by operation of the mirror moving mechanism 21 to change the light path length of the reference light $L_1$, the position where the light path lengths of the reference light $L_1$ and the measuring light $L_2$ match each other can be located.

A geometrical light path length of the measuring light $L_2$ from the low coherent light source 14 to the front end of the probe 5 is fixed. Therefore, in the shape extraction section 23, a distance from the front end of the probe 5 to the inner surface of the hole 2 is accurately calculated by subtracting the light path length of the measuring light $L_2$ to the front end of the probe 5 from the light path length of the reference light $L_1$ in the position where the light path lengths of the reference light $L_1$ and the measuring light $L_2$ match each other. Moreover, in the shape extraction section 23, the calculated distance from the front end of the probe 5 to the inner surface is associated with angle position information of the rotation mechanism 4 and axial direction position information of the rectilinear movement mechanism 13 and stored.

Then, in this state, the rotation mechanism 4 is operated, and it is stopped when the workpiece 3 has rotated only by a very small angle with respect to the probe 5. By repeatedly carrying out the above measuring operation, a distance from the front end of the probe 5 in a predetermined axial direction position to the inner surface of the hole 2 is obtained for the entire periphery.

Next, the rectilinear movement mechanism 13 is operated, and it is stopped when the probe 5 has moved with respect to the workpiece 3 in the axial direction only a very small distance. By repeatedly carrying out the above measuring operation for the entire periphery, the inner surface shape of the hole 2 can be measured within a predetermined range.

According to the present embodiment, the inner surface shape is measured using interference of low coherent lights $L_1$ and $L_2$ without a contacting probe. Accordingly, the probe 5 is constructed in a thin shape to enable measurement of the inner surface shape of a hole 2 of a small diameter at a high level of accuracy. Moreover, there is the further advantage that an inner surface shape of a hole 2, the small diameter of which becomes greater the further in from the entry, can also be measured at a high level of accuracy.

Furthermore, in the inner surface measuring apparatus 1 according to the present embodiment, with the probe 5 fixed with respect to the workpiece 3, the mirror 20 is moved to measure the distance between the probe 5 and the inner surface of the hole 2, and this measurement is repeated. Instead of this, the measurement may be carried out by maintaining the rotation of the workpiece 3 with respect to the probe 5 by the operation of the rotation mechanism 4 and by slightly moving the mirror 20 by the operation of the mirror moving mechanism 21. This way has the advantage that a plurality of circumferential positions at which the distance between the probe 5 and the inner surface of the hole 2 are equal can be detected in a short period of time, and a length of time required for measuring can be reduced.

Moreover, in the present embodiment, the workpiece 3 is rotated while the probe 5 is fixed. Alternatively, the probe 5 may be rotated while the workpiece 3 is fixed. Furthermore, in the present embodiment, the probe 5 is moved in the axial direction with respect to the workpiece 3. Alternatively, the workpiece 3 may be moved in the axial direction while the probe 5 is fixed.

Furthermore, in the present embodiment, the low coherent light $L_0$ is divided into the reference light $L_1$ and the measuring light $L_2$, and a single half mirror is employed as a member for multiplexing the reference light $L_1$ and the measuring light $L_2$. Alternatively, a low coherent light dividing section and a low coherent light multiplexing section may be separately provided.

Figure 3:
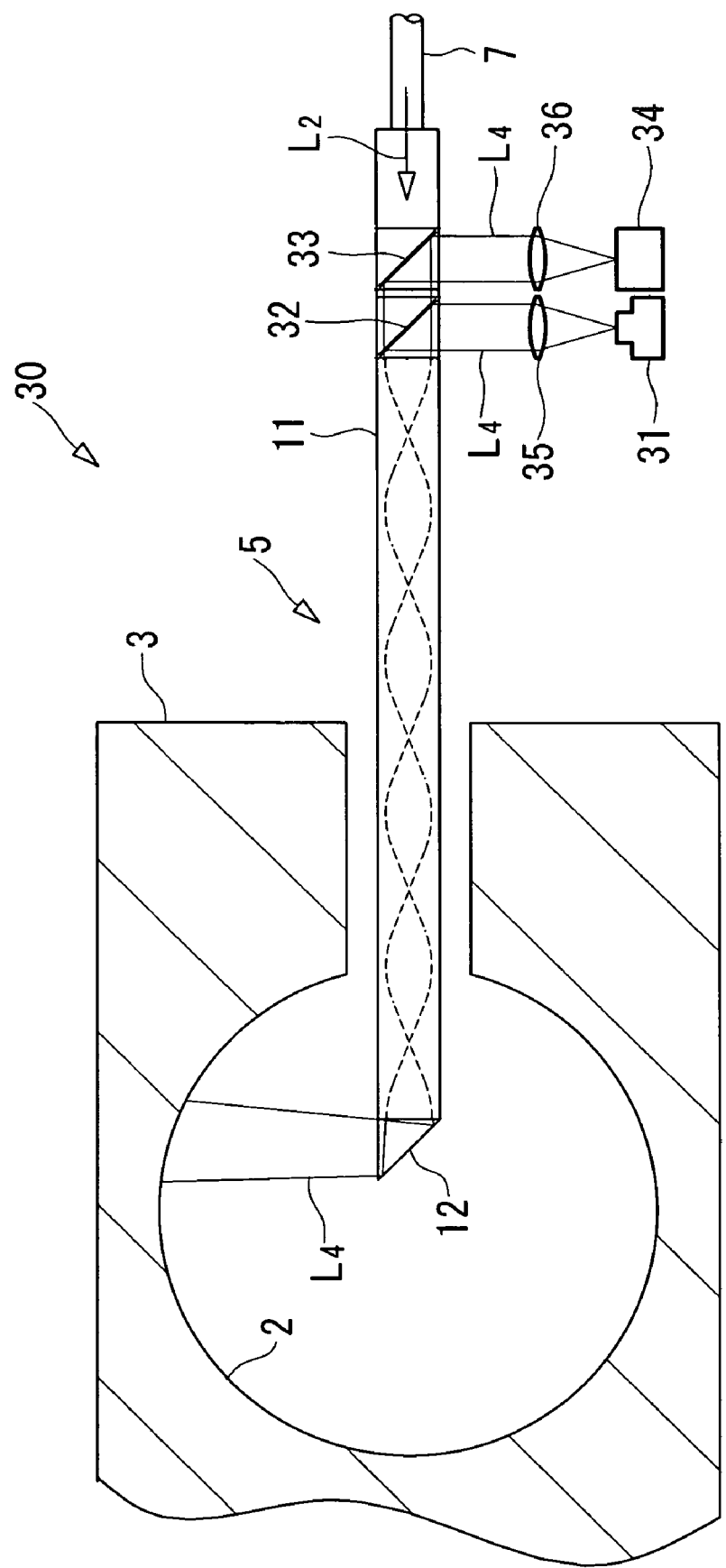
FIG. 3 is a diagram that schematically shows the close proximity of the probe of the inner surface measuring apparatus according to a second embodiment of the present invention.

Next, an inner surface measuring apparatus 30 according to a second embodiment of the present invention is described, with reference to FIG. 3.

In the description of the present embodiment, similar reference symbols are given to the parts that are common to the configuration of the inner surface measuring apparatus 1 according to the first embodiment, and their descriptions are omitted.

As shown in FIG. 3, an inner surface measuring apparatus 30 according to the present embodiment comprises: an illumination light source 31 that outputs visible light $L_4$ for illumination to the rear end of a probe 5; a multiplexing prism (illumination light multiplexing section) 32 that inputs the visible light $L_4$ from the illumination light source 31 into the light path of a measuring light $L_2$; a dividing prism (light dividing section) 33 that separates from the light path of the measuring light $L_2$, the visible light that has been reflected on the inner surface of the hole 2 of the workpiece 3 and returned; and an image pickup device 34 that picks up the divided visible light $L_4$. Reference symbols 35 and 36 denote condensing lenses in the diagram.

In the inner surface measuring apparatus 30 according to the present embodiment having such a configuration, the visible light $L_4$ emitted from the illumination light source 31 is input by the multiplexing prism 32 into the probe 5, and emitted from the front end of the probe 5 together with the measuring light $L_2$. The emitted visible light $L_4$ illuminates the inner surface of the hole 2 and the reflected light $L_4$ thereof returns into the probe 5. The reflected light $L_4$ that returns into the probe 5, travels backward through the probe 5, and is separated from the light path of the measuring light $L_2$ by the dividing prism 33 and is picked up by the image pickup device 34. As a result, an image of the inner surface of the hole 2 within the area in close proximity to the position on which the measuring light $L_2$ is irradiated, can be obtained.

Therefore, in the inner surface measuring apparatus 30 according to the present embodiment, when measuring the inner surface shape of the hole 2 of the workpiece 3, it becomes possible to obtain an image of the status of the inner surface of the hole 2 being measured, and the status of the inner surface can be observed while carrying out inner surface measuring. Therefore, for example in the case where a peculiar inner surface shape is determined while measuring, the status of this location can be further observed.

Moreover, in the case where the measuring light $L_2$ to be used for measuring is visible light, the spot light of the measuring light $L_2$ can be visually checked in the image. Therefore the measuring position and the inner surface shape therein can be associated and confirmed within the image. On the other hand, in the case where the measuring light $L_2$ to be used for measuring is invisible light, the spot light thereof cannot be visually checked. In this case, for example, if a sight is displayed in the center of the image by pre-adjusting the measuring light $L_2$ so as to be irradiated on the central position of the displayed image, the position on which the measuring light $L_2$ is irradiated can be confirmed in the image.

Figure 4:
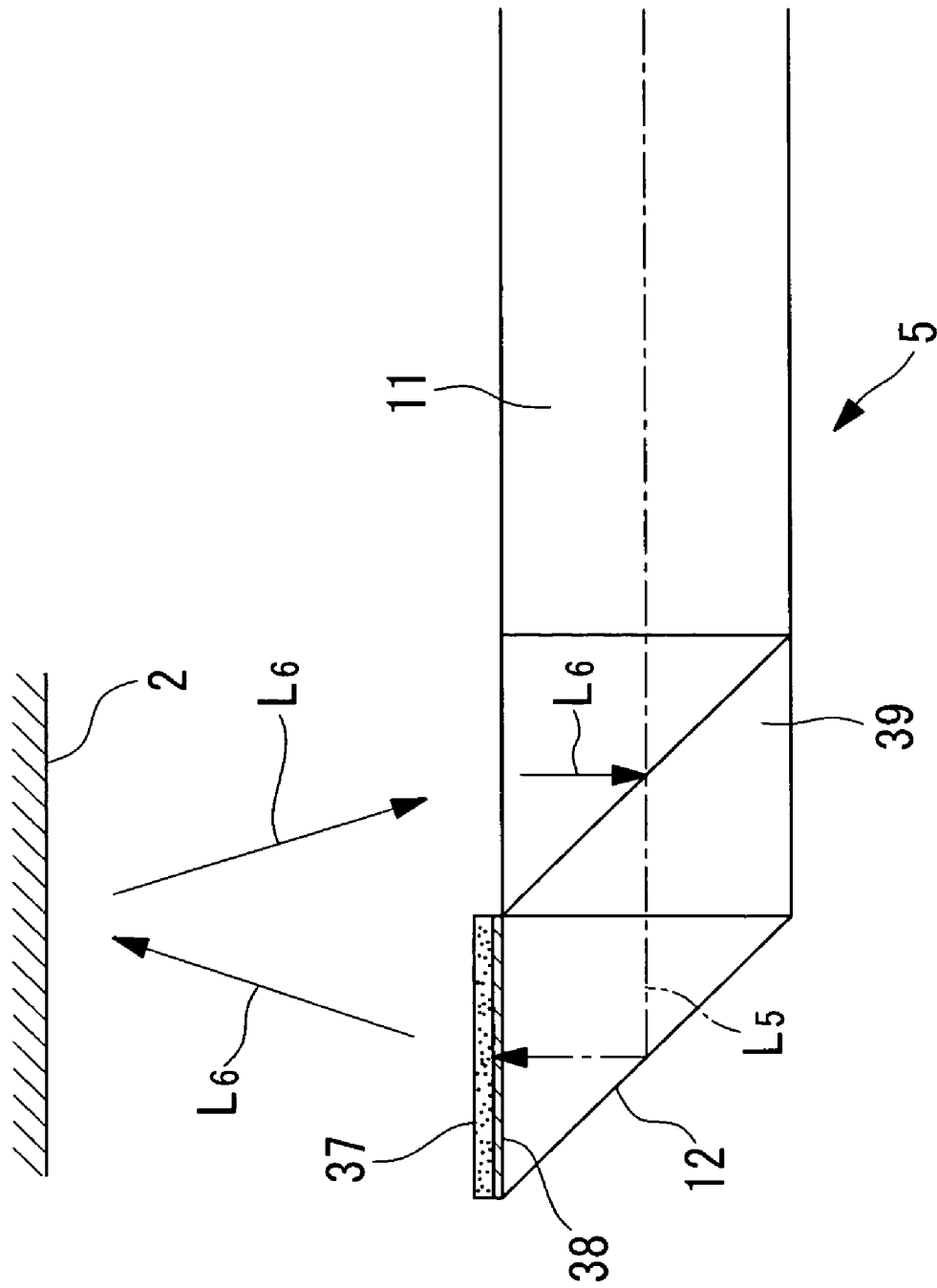
FIG. 4 is an overall configuration diagram showing a variant example of the inner surface measuring apparatus shown in FIG. 3.

Moreover, in the present embodiment, an illumination light source 31 that outputs visible light $L_4$ for illuminating the inner surface of the hole 2 is employed. Instead of this, as shown in FIG. 4, the illumination light source 31 may output invisible (wavelength bandwidth outside of the sensibility of the image pickup device 34) excitation light $L_5$, and a fluorescent substance 37 that emits fluorescent light $L_6$ when excited by the excitation light $L_5$ may be arranged on the front end of the probe 5. In FIG. 4, reference symbol 39 denotes a fluorescence multiplexing prism that merges the returned fluorescent light $L_6$, which has been reflected in the hole 2, with the light path of the measuring light $L_2$ of the probe 5.

As the excitation light $L_5$ emitted from the illumination light source 31 travels through the heterogeneous medium lens 11 inside the probe 5 and is irradiated from a prism 12 on the front end of the probe 5 towards the inner surface of the hole 2, it is incident on the fluorescent substance 37 to generate a fluorescent light $L_6$. The generated fluorescent light $L_6$ illuminates the inner surface of the hole 2 and the reflected light $L_6$ that has been reflected and returned returns into the probe 5, and is then separated from the light path of the measuring light $L_2$ by the dividing prism 33, and is picked up by the image pickup device 34.

In this way, compared to the case where visible light $L_4$ from the illumination light source 31 travels through the probe 5 and is emitted from the front end of the probe 5 and is reflected on the inner surface of the hole 2 and travels backward inside the probe 5, since the fluorescent light $L_6$, which is visible light, only needs to travel in the probe 5 in one returning direction, the occurrence of flare in the optical system inside the probe 5 can be prevented. As a result, there is an advantage of obtaining a clear image, while preventing the occurrence of flare on the obtained image.

In this case, it is preferable to arrange a fluorescent reflection film 38 that allows the excitation light $L_5$ to pass through while reflecting the fluorescent light $L_6$, on the light source side of the fluorescent substance 37. Since the fluorescent light $L_6$ generated in the fluorescent substance 37 is reflected by the fluorescent reflection film 38, the generated fluorescent light $L_6$ can be prevented from directly returning into the probe 5, while increasing the light amount of the fluorescent light $L_6$ that illuminates the inner surface of the hole 2. Accordingly, there is an advantage of obtaining a bright image.

What is claimed is:

1. An inner surface measuring apparatus comprising:
   a low coherent light source that outputs low coherent light;
   a low coherent light dividing section that divides one portion of the low coherent light outputted from the low coherent light source in to two;
   a light path length adjusting section that adjusts a light path length of one of the low coherent lights divided by the low coherent light dividing section;
   a straight rod shaped probe that irradiates the other of the low coherent lights divided by the low coherent light dividing section from a front end section onto a measurement object arranged in a direction intersecting with the lengthwise direction of the probe;
   a low coherent light multiplexing section that multiplexes a low coherent light that returns having been reflected on the measurement object with the one low coherent light whose light path length has been adjusted by the light path length adjusting section;
   a light detector that detects the multiplexed low coherent light;
   a rotation mechanism that relatively rotates the probe and the measurement object about an axis along the lengthwise direction of the probe;
   an illumination light source that outputs illumination light;
   an illumination light multiplexing section that is arranged between the probe and the low coherent light multiplexing section and that receives the illumination light from the illumination light source along an optical axis of the low coherent light;
   a light dividing section that divides the illumination light reflected on the measurement object from the low coherent light;
   an image pickup device that picks up the divided reflected light which is separated from the low coherent light by the light dividing section; and
   a display device that displays an image obtained by the image pickup device.

2. An inner surface measuring apparatus according to claim 1, wherein the illumination light source outputs an excitation light which has a wavelength bandwidth that cannot be sensed by the image pickup device, and on the front end of the probe there is provided a fluorescent substance that generates visible light when excited by the excitation light, and a reflection light multiplexing section that merges the visible light reflected by the measurement object with the light path of the excitation light.

3. An inner surface measuring apparatus according to claim 2, wherein on the illumination light source side of the fluorescent substance there is arranged a visible light reflection film that allows the excitation light to pass through while reflecting the visible light.

* * * * *